United States Patent [19]

Schaefer et al.

[11] Patent Number: 4,480,179

[45] Date of Patent: Oct. 30, 1984

[54] APPARATUS FOR CODING AND/OR DECODING A DOCUMENT

[75] Inventors: Louis F. Schaefer, Palo Alto; Termpoon Kovattana, Menlo Park, both of Calif.; Tommy Henningson, Järfälla, Sweden

[73] Assignee: Esselte Nordia AB, Solna, Sweden

[21] Appl. No.: 420,628

[22] Filed: Sep. 21, 1982

[30] Foreign Application Priority Data

Sep. 30, 1981 [SE] Sweden ................................ 8105770

[51] Int. Cl.[3] ................................................ G06K 7/14

[52] U.S. Cl. .................................... 235/473; 235/455; 235/475

[58] Field of Search ........................ 235/473, 455, 475; 250/566

[56] References Cited

U.S. PATENT DOCUMENTS 4,228,952 10/1980 Britton ................................ 235/473

*Primary Examiner*—Harold I. Pitts

*Attorney, Agent, or Firm*—LeBlanc, Nolan, Shur & Nies

[57] ABSTRACT

An apparatus for coding and/or decoding a document, comprising a light path (27,28,29) formed of optic fibres and capable to direct light from a lens for focusing the light from a document to be coded or decoded to a light-sensitive device for recording a coded and, respectively, decoded copy of an uncoded and, respectively, coded document. The light path (27,28,29) consists at least along a section of a coding and/or decoding unit (29) comprising a code disc (32) provided with optic fibres (62), the respective ends of which are connected to a first and, respectively, second light guide (27 and, respectively, 28), associated with the light path. The fibres (62) at one end surface of the code disc (32) have a different mutual order than at the other end surface of the code disc. The fibres (62) of the code disc (32) and the fibres (60,61) of the light guides (27, 28) at the end surfaces of the code disc (32) and, respectively, at the ends of the light guides (27,28) are located along a circle.

7 Claims, 7 Drawing Figures

APPARATUS FOR CODING AND/OR DECODING A DOCUMENT

The present invention relates to an apparatus for coding and/or decoding a document, for example a typewritten or printed paper, pictures of various kinds etc.

BACKGROUND OF THE INVENTION

In industry and commerce, administration offices etc. the demand of being able to code documents of various types has latterly been accentuated. The documents in question primarily are in the form of typewritten sheets and include information, which should not be accessible to everyone, for example in a company. Said demand, of course, covers written information of all imaginable types, even pictures.

In order to satisfy this demand, both an apparatus for coding the material and an apparatus for decoding the same are required.

Provided that such apparatuses are commercially available, typewritten documents, for example, can be stored in coded state and be decoded when required. Such storage can be arranged open, for example in a company, without any person being able to read the information. In such cases, however, it is very essential that not everybody in the company can utilize an apparatus for decoding all documents.

It is previously known to use a fibre-optic cable comprising a row of fibres located adjacent each other for scanning a document, where one end of the fibres are located in a certain order relative to each other, and the other end of the fibres are located in a different mutual order. A document in principle is scanned optically by one end of the fibre-optic cable while the light thus scanned is projected from the other end of the cable on a copying paper or the like. The scanning proceeds in such a manner, that the document to be scanned and, respectively, the copying paper move synchronously relative to the row or line of fibre-optic fibres, whereby the document is scanned continuously or in steps line by line.

When a document is being scanned in this way, the text or picture of the copy is distorted, i.e. coded. When thereafter the coded copy is scanned by passing the light in the other direction through the cable, the text of the original document is restored.

A coded document can be decoded when the code, which consists of the positions of the respective ends of the fibres relative to each other in a cable, is known.

It is, thus, desired to have access to a great number of different coding patterns, so that a decoding operation is extremely time-consuming and difficult, if at all practically possible to be carried out without knowledge of the code.

A further desire is that an apparatus of the kind here referred to is constructed so that different coding patterns can be utilized for different security and/or competence levels, for example of members of the staff.

The total number of coding patterns, thus, should be great. Furthermore, the switching between different coding patterns should take place repidly and unnoticeably.

SUMMARY OF THE INVENTION

The present invention proposes an apparatus of the aforesaid kind, by means of which a.o. the above requirements are met, and a series of essential advantages over the known art are obtained.

The present invention, thus, relates to an apparatus for coding and/or decoding a document, comprising a light path formed of optic fibres and capable to direct light from a lens or lens system for focusing the light from a document to be coded or decoded to a light-sensitive device, such as a photoconductive drum, for recording a coded and, respectively, decoded copy of an uncoded and, respectively, coded document. The invention is characterized in that said light path along at least a section consists of a coding and/or decoding unit, comprising a code disc provided with optic fibres, the respective ends of which are connected to a first and, respectively, a second light guide associated with the light path, that the fibres at one end surface of the code disc have a mutual order different from that at the other end surface of the code disc, that the ends of said fibres are locating along a circle at the respective end surface of the code disc, as the fibres at the end of the first and, respectively, second light guide facing toward the code disc are located along a circle with the same diameter, and that the code disc is rotatable to different positions where all fibres in the two light guides ae bound together via the code disc.

BRIEF DESCRIPTION OF THE DRAWINGS

The invention is described in greater detail in the following, with reference to the accompanying drawings, in which.

DESCRIPTION OF THE PREFERRED EMBODIMENT

Figure 1:
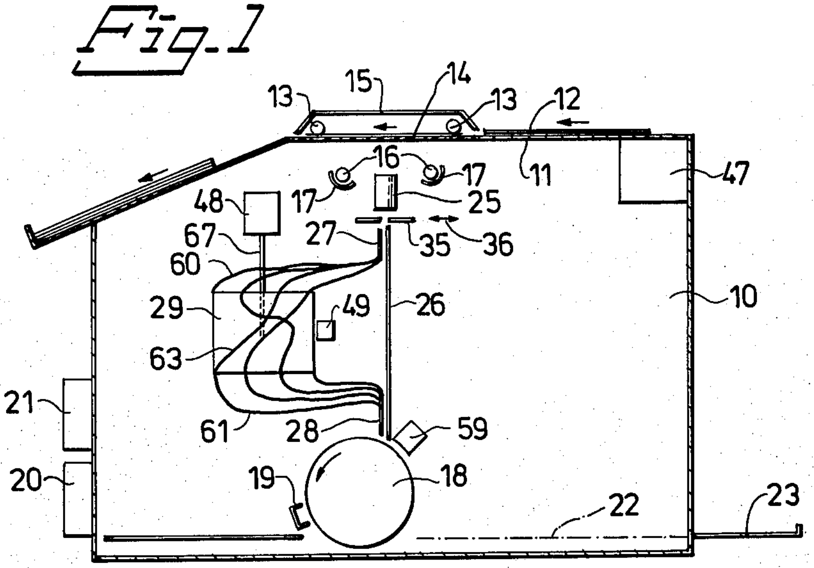
FIG. 1 is a schematic view of the apparatus with the invention applied thereto.

In FIG. 1 an apparatus is shown schematically, to which the invention is applied. The apparatus is used at a known photocopying machine 10, which comprises an infeed table 11 for documents 12 to be copied and infeed rolls 13 for feeding-in and positioning the document over a glass plate 14 and beneath a cover plate 15. The photocopying machine further comprises lamps 16 and reflectors 17 for lighting the document 12, an optic system for projecting the document on a drum 18, in connection to which a copying paper is provided and exposed in known manner. The numeral 19 designates an applicator station for pulverized carbon or corresponding medium, a so-called toning station. Copying paper is charged into two magazines 20,21 in the machine. The numeral 22 designates schematically the path of the copying paper to a discharge plate 23 for a complete copy.

The aforedescribed photocopying machine is known in its entirety and per se does not constitute a part of the present invention. It is, therefore, described in detail only to the extent necessary for the understanding of the invention.

Substantially any photocopying machine utilizing fibre optics can be used for applying the present invention thereto.

The invention is directed to said optic system comprising a light path, which optically binds together the light coming from a lighted document 12 with the copying paper on the drum 18.

In a conventional copying machine utilizing fibre optics a one-dimensional row of optic fibres is provided, which forms a plane light guide, a so-called cable, in order to project light from the document on the photoconductive drum 18.

For collecting a picture or, rather, a row or a line of the picture, with a plane light guide of optic fibres, it is advantageous to use a so-called selfoc-lens 25 (manufactured a.o. by Nippon Sheet Glass Company Ltd., Tokyo, Japan) which collects the light and directs it into a conventional plane light guide. For coding a picture, according to the invention a first plane light guide 27 is connected to the optics 25 near the document, and a second plane light guide 28 is connected to the drum 18. Between said two plane light guides 27,28 a light-conductive arrangement 29,30 of fibre-optic fibres is located so that a fibre located in a certain place in the first plane light guide 27 is optically bound together with a fibre located in a different place in the second plane light guide 28. Preferably, each of the fibres in the first plane light guide 27 is connected in the second light guide 28 to a fibre, the location of which differs from the location of the associated cable in the first light guide 27. It is, however, not necessary to shift in this way the order for all fibres.

Hereby, thus, a coding is obtained in that the picture or text of the document is restowed in fragments.

The tightness of the fibres in the plane light guide is high, preferably of the magnitude 200 to 300 pieces per length of 25 mm. This implied, that a document of A4-size is scanned along its length after a line of about 2400 to 3600 fibres arranged in rows and forming said first light guide 27. The number of cables, of course, may be higher, but also lower.

According to a preferred embodiment, several adjacent fibres are arranged to follow each other with unbroken mutual order through the entire optic system. As an example, the plane light guides may include 240 fibres per 25 mm, divided into 80 groups of 6 fibres each. In this case an A4-paper sheet is divided along its length in a line, which in its turn comprises 80 elements per 25 mm.

It is obvious that the restowing of 80 elements per 25 mm in a certain order on the document to a different order on the copying paper yields a completely distorted copy.

According to the present invention, the light-conductive arrangement 29 between the plane light guides 27,28 has the form of two outer rings 30,31 and coding and decoding ring 32 therebetween. The fibres 60 of the upper first plane light guide are uniformly spread out and attached to the periphery of the first outer ring 30, and the fibres 61 of the lower second plane light guide 28 are uniformly spread out and attached to the periphery of the second outer ring 31. The coding and decoding ring 32, hereinafter called code ring 32, is at its outer plane circular ends along the periphery provided with fibre-optic fibres 62, the ends of which join the ends of respective fibres in the first outer ring 30 and, respectively, second outer ring 31. Thus, light can be guided from the first plane light guide 27 via the first outer ring 30, through the code ring 32 and further through the second outer ring 31 to the second plane light guide 28.

In the code ring 32 preferably each of the fibres 62 binds together different positions along the periphery of the code ring 32, whereby the mutual order of the fibres on one side of the code ring 32 is an entirely different one than the order on the other side.

The code ring 32 is capable via a motor and scanning device 33 to be rotated through a number of the different possible positions where the guides of the two outer rings 30,31 are bound together.

According to a preferred embodiment, the cables are uniformly distributed along the entire or parts of the periphery of the outer rings 30,31 and, respectively, code ring 32.

Figure 2:
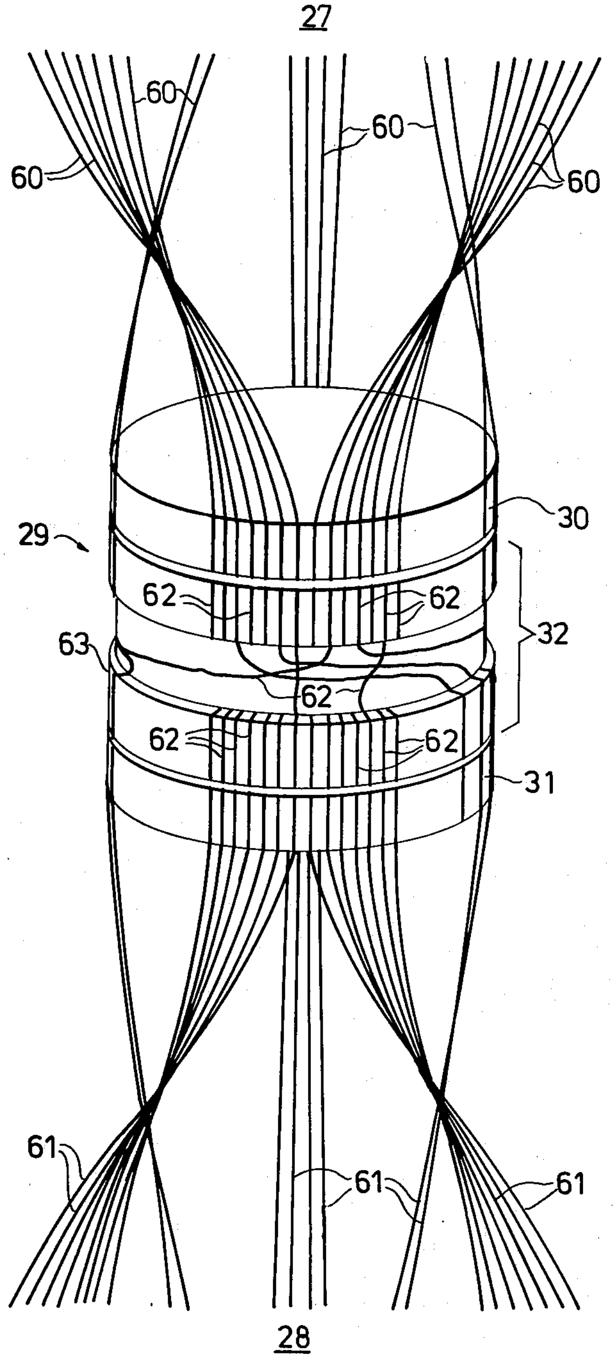
FIG. 2 shows on a greater scale a detail in the apparatus.

In FIG. 2 cables are shown only along a portion of the circumference of the rings 30,31,32.

Figure 5:
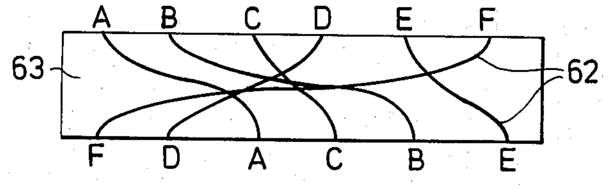
FIGS. 5 and 6 are schematic sketches to facilitate the understanding of the invention.

In FIG. 5 the periphery 63 of the code ring 32 is schematically shown straightened. The letters above and beneath the ring indicate the fibre ends belonging to each other.

For decoding a coded document, light is required to be sent through the same light path, but in opposite direction, or alternatively through an inverted code ring. This is shown schematically in FIG. 6 where the letters in a corresponding way indicate fibre ends belonging to each other.

According to an embodiment (not shown) two code rings 32 are provided, one of which is intended for coding and the second one for decoding. In this case preferably the two plane light guides 27,28 are shifted to the respective code ring, depending on whether coding or decoding is to be carried out.

According to another embodiment, the code ring 32 is arranged so as in certain cases to be taken out of its position shown in FIGS. 1 and 2, be turned through 180 degrees about its diameter and thereafter again be set in the position shown, depending on whether coding or decoding shall take place.

Figure 6:
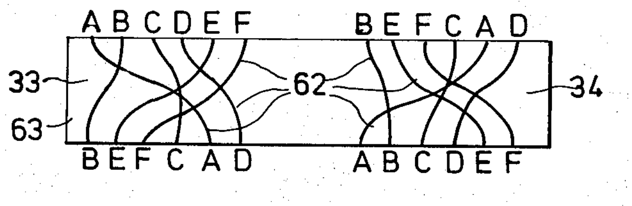

According to a preferred embodiment shown schematically in FIG. 6, the code ring 32 includes a section 33 for coding and a section 34 for decoding. In FIG. 6 the document can be assumed be located above, and the drum 18 below the ring. In this case the left-hand section 33 is a coding section.

A document to be coded is placed above the ring in FIG. 6 and, thus, is coded so that the aforesaid elements are shifted as exemplified in the Figure.

When a document thus coded is to be decoded, the code ring 32 is turned so that the right-hand section in FIG. 6 binds together the light guides 27,28. At the copying of the coded document, thus, a decoded document will be produced, because the light paths in the right-hand section 34 have an inverted mutual order compared with the left-hand section 33. Thus, a copy corresponding to the original document is obtained.

The two sections 33,34 preferably are located in different places about the periphery of the code ring 32, but they also may be woven one into the other. There does not exist only one coding and one decoding section, but there are a great number of each kind, i.e. as many as there are different codes.

Figure 3:
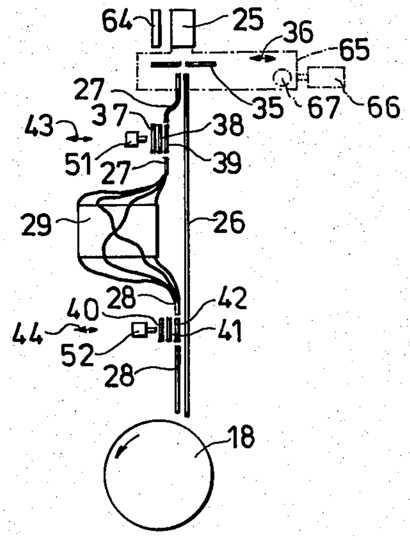
FIG. 3 shows a modified embodiment of the apparatus.

In FIGS. 1 and 3, in addition to the aforedescribed arrangement 27,28,29, a further light guide 26 is provided between the selfoc-lens 25 and the drum 18 and intended to be used at normal copying without coding and, respectively, decoding. The fibres of the unbroken light guide 26, thus, have the same mutual order through the entire light guide 26.

A plate 35 with a gap is located between the selfoc-lens 25 and the first plane light guide 27 and, respectively, the unbroken light guide 26. The plate 35 is capable by suitable means to be moved in directions of the arrow 36 in order thereby to connect one of the light guides 27,26 with the selfoc-lens 25.

In FIG. 3 a modified embodiment of the invention is shown where the plane light guides 27,28 are broken and where there are provided three different light-guides 37,38,39 and, respectively, 40,41,42 at the interruption in each one of the first and the second plane light guides 27,28. One of these additional light-guides 37,40 is arranged so that the mutual order between the cables is the same along the light guide, while the second light-guide 38,41 and, respectively, the third one 39,42 are a coding and, respectively, decoding light-guide.

The fibres at the coding light guides 38,41 are arranged so that their respective ends have different mutual order. The fibres of the decoding light guides 39,42 are arranged so that their respective ends have a mutual order, which is inverted compared with the coding light-guides 38,41 in question.

At each interruption in the first light guide 27 and, respectively, second light guide 28 either only one coding and one decoding light guide may be provided or there may be an optional number of such guides. Irrespective of the number, however, there are an equal number of decoding light guides and coding light guides. The additional light guides 37,42 are movable in the directions of the arrows 43,44 in order thereby to be set against the ends of the broken plane light guides 27,28 and connect said ends. Hereby the number of possible codes is doubled.

Preferably, however, it is referred to codes of different security level or different application fields within a company, such as, for example, a general security level, at which the light guides designated 37,40 are utilized, while the two light-guides designated 38,41 are utilized for coding, and the two light-guides 39,42 are utilized for corresponding decoding of documents of a higher security level, for example material concerning only the management of the company.

According to this embodiment, for example, the management can have access to a code, magnetic card or the like, by means of which the light-guides designated 39,41,40,42 and thereby thus additional code combinations with the coding device 29, can be obtained.

Figure 4:
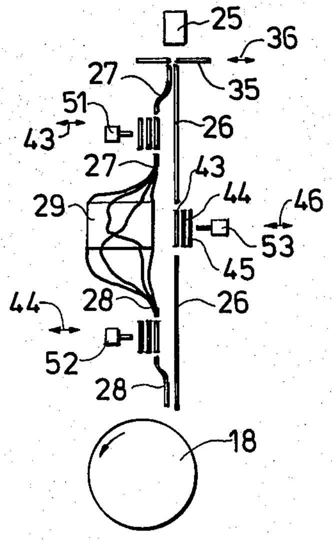
FIG. 4 shows a further modified embodiment of the apparatus.

In FIG. 4 the embodiment shown in FIG. 3 is modified additionally in that even the aforesaid unbroken light guide 26 is broken and connected to one of three additional light guides 43,44,45, which latter provide space for a coding and corresponding decoding. At one 43 of the additional light guides the fibres are arranged in the same mutual order along the entire light guide and, thus, do not give rise to any coding or decoding. The lastmentioned three light guides 43,44,45 are movable by suitable means in the directions of the arrow 46. The light guides designated 44,45 can be utilized for the lowest security level within a company, such as only internal documents, and, therefore, every employee can have access to this coding and decoding possibility.

The movement of the light guides 37,38,39,40,41,42 and, respectively, 43,44,45 preferably is effected by step-motors 51,52,53 or other electromagnetic devices of known type.

The motor and scanning device 33 comprises, in addition to a motor 48 for driving the code ring 32 by means of an axle 67, a scanning device 49 capable to scan the position of rotation of the code ring 32. Said scanning device 49 may be a pulse transducer located at the periphery of the code ring 32.

As is obvious to the expert, the drive equipment required for the device 10 can be designed in many ways and by different power-producing means. The invention, therefore, is not restricted to any design of the drive equipment.

Figure 7:
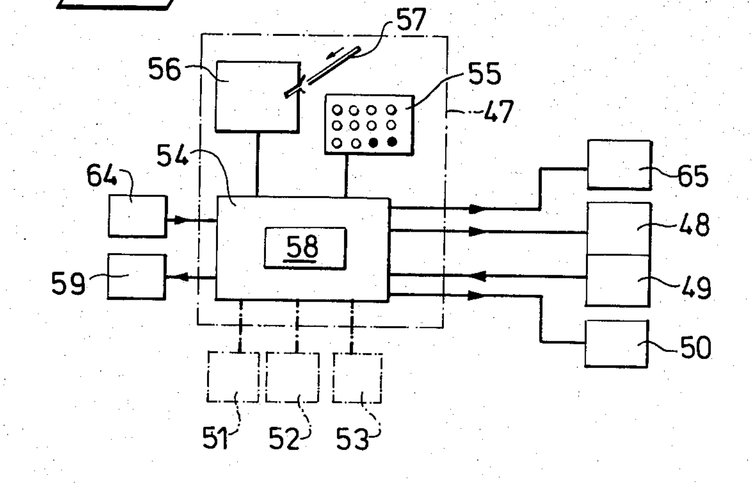
FIG. 7 is a schematic view of a block diagram for a control device.

According to the invention, a control device 47 is provided for controlling the coding and decoding positions, see FIG. 7. To said control device are connected the motor 48 and the scanning device 49. Furthermore, a drive means 50 for the plate 35 and, where appropriate, drive means 51,52,53 for each of the additional light guides 37,38,39,40,41,42,43,44,45, are connected.

The control device 47 comprises a microcomputer 54 or corresponding unit and preferably a keyboard 55 and an identity recording unit 56. Said identity recording unit 56 is an identity card 57 with electronically stored information intended to be inserted. Said control device 47 is capable by means of the microcomputer 54 and a memory 58 associated therewith to scan the competence of a person to select codes and in general to check a person's competence of using the machine. The person proved to be competent can thereafter select by means of the keyboard a code for coding a document.

At the start of a coding or decoding operation, the control device 47 emits control signals to the drive means 48,50,51,52,53 concerned in order thereby to set the desired code. The microcomputer 54 of the control device is capable from a numerical code keyed-in by means of the keyboard 55 to calculate the positions of the different drive means for a coding or decoding corresponding to the numerical code to be carried out. The scanning device 49 is capable to emit to the microcomputer a signal including information on the position of rotation of the code ring 32.

At the coding of a document, the copy preferably is provided with a designation including information on the code, which was used. This designation may consist of a number of signs, which are applied to the document by a separate means 59 which, for example, may consist of a ramp having five or six signs, such as digits, where a digit combination corresponding to the code in question is exposed directly to the drum at the start of the copying. The means 59 is connected to and controlled by the control device 47. When a coded document is to be decoded, the said digit combination is keyed-in on the keyboard 55. Before decoding is carried out, however, the control means 47 scans in the aforedescribed manner that the person in question has the competence of decoding a document in the code concerned.

The separate means 59 may also be capable to generate a line code on the copy. For that case preferably a means of known kind for reading the line code is provided. This reading means may either be a reading pen operated by the person supposed to decode the document, or consist of a reading device located in the copying machine and automatically operated thereby. When such a reading device is provided, it is connected to the control device 47 in order to decide in the aforedescribed manner whether the person concerned is competent to decode a document in the code in question.

For being able to correctly decode a document, of course, the document to be decoded must be aligned correctly in relation to the first plane light guide 27. The accuracy in alignment depends on the number of the aforesaid elements, i.e. groups of cables.

For this purpose, the copying paper used for making coded documents preferably is a special paper stored in one 20 of the magazines, while paper for direct normal copying or for the production of decoded documents is normal conventional copying paper stored in the second one 21 of the magazines.

The said special paper, according to one embodiment, is provided with a line along one longside of the paper. At the decoding of such a document consisting of a paper with a line, a separate scanning device 64 is provided to scan the position of the line and to emit an output signal with information on the line position to the control device 47. The scanning device 64 is shown only in FIG. 3, for reasons of clearness. The control device 47 is capable to control a drive means 65, for the sake of clearness shown only in FIG. 3, for aligning the first light guide 27, the unbroken light guide 26 as well as the lens 25 and plate 35 so, that these means 25,26,27,35 are aligned correctly in relation to the line. The drive means 65 comprises two motors 66,67 operating in two directions perpendicular to each other.

When such aligning has taken place, the decoding is started by the control device 47, in that the coded document is copied.

The embodiments described above must not be regarded restrictory to the invention, which can be modified in many ways without abandoning the invention idea.

The code disc 32, for example, can rotate continuously or in steps between different positions of rotation, in which latter case the light on the document is scanned in steps. The coding is hereby changed continuously. There is, of course, information available on how a coding has been carried out in the microcomputer, and decoding is carried out in a corresponding procedure.

The invention, thus, can be varied within its scope defined in the attached claims.

We claim:

1. An apparatus for coding and/or decoding a document, comprising a light path (27,28,29) formed of optic fibres and capable to direct light from a lens (25) or lens system for focusing the light from a document to be coded or decoded to a light-sensitive means, such as a photoconductive drum (18), for recording a coded and, respectively, uncoded copy of an uncoded and, respectively, coded document, characterized in that said light path (27,28,29) along at least a section consists of a coding and/or decoding unit (29) comprising a code disc (32) provided with optic fibres (62), the respective ends of which are connected to a first and, respectively, second light guide (27 and, respectively, 28) associated with the light path, that the fibres (62) at one end surface of the code disc (32) have a different mutual order than at the other end surface of the code disc (32), that the ends of said fibres (62) are located along a circle at the respective end surface, of the code disc (32) as the end of the first (27) and, respectively, second (28) light guide facing to the code disc (32) has its fibres (60,61) located along a circle with equal diameter, and that the code disc (32) is rotatable to different positions of rotation where all fibres (60,61) in the two light guides (27,28) are bound together via the code disc (32).

2. An apparatus as defined in claim 1, characterized in that the code disc (32) is capable in a number of rotation positions to bind together all fibres (60,61) in the two light guides (27,28), thereby forming a number of different codes, and in an equally great number of additional rotation positions to bind together all fibres (60,61) in the two light guides (27,28), at which latter rotation positions the mutual order of the respective ends of the fibres (62) of the code disc (32) is inverted, so that each of the lastmentioned rotation positions corresponds to one of the firstmentioned rotation positions and thereby effects decoding of a coded document.

3. An apparatus as defined in claim 1 or 2, characterized in that the ends of the code disc (32) have circle-shape, and that the ends (30,31) of the end surfaces of said two light guides (27,28) facing to the code disc (32) are circular.

4. An apparatus as defined in claim 3, characterized in that the ends of the fibres (62,60,61) of the code disc (32) and light guides (27,28) are located on the periphery of the respective said circular end surface.

5. An apparatus as defined in claim 4, characterized in that the code disc (32) between the circular ends includes a portion where the mutual order of the fibres (62) is redistributed, so that the respective ends of the fibres (62) have a different mutual order at one end surface of the code disc (32) than at the other end surface.

6. An apparatus as defined in claim 1,2,3,4 or 5, characterized in that the first (27) and the second (28) light guide are broken in one additional place where in both places one of two, or of another even number of plane coding and/or decoding light guides (37,39,40,42) are located to bind together the light guides (27,28) along their entire length, where at least one of the light guides, a coding light guide (38,41) has the fibres arranged so that their respective ends have different mutual order, and where this or any coding light guide (38,41) is corresponded by a decoding light guide (39,42), which have the fibres so arranged that their respective ends have a mutual order which is inverted compared with the coding light guide (38,41) in question.

7. An apparatus as defined in claim 1, characterized in that an additional light guide (26) is provided from the lens (25) to the light-sensitive device (18), which light guide (26) has its fibres arranged in the same mutual order along the entire length of the light guide (26), and that a plate (35) provided with a gap, or a corresponding means, is provided between the end of the light guide (26) located closest to the lens (25) and the lens (25), and the plate (35) and, thus, the gap are movable to shift the light from the lens (25) to one or the other of the light guides (27,26).

* * * * *